Patented Apr. 10, 1945

2,373,192

UNITED STATES PATENT OFFICE 2,373,192

ANTIOXIDANTS

Walter M. Lauer, St. Paul, Minn., assignor, by mesne assignments, to the United States Secretary of Agriculture, or his successors in office No Drawing. Application March 13, 1943, Serial No. 479,132

7 Claims. (Cl. 99—163)

This invention relates to antioxidants and more particularly to non-toxic, naturally occurring antioxidant of vegetable origin, suitable for use in edible fats, butters, oils and oleaginous materials, for use in medicinals and pharmaceuticals containing oily or greasy ingredients, and the like, all of which as rectified or prepared for marketing are subject to oxidative changes which are evidenced by rancidity.

It is an object of the invention to provide a naturally occurring vegetable antioxidant.

More particularly it is an object of the invention to provide edible, non-toxic, naturally occurring antioxidant for lard, butter, edible oils and the like having superior effectiveness in preserving such materials in fresh and edible condition for long periods so as to permit packaging in sealed containers and storage in hot climatic conditions for long periods.

I have discovered that beta, gamma-dimethyl-alpha, delta-bis (3,4-dihydroxyphenyl) butane, a phenol, sometimes known as nordihydroguaiaretic acid, is an effective antioxidant for oleaginous materials, particularly lard, tallow, grease, butterfat, edible oils, and edible hydrogenated animal and vegetable oils which are commonly used for foodstuffs. Nordihydroguaiaretic acid is an effective antioxidant in medicinal and pharmaceutical preparations in which an oil or fat is a constituent, such as lard, lanolin, corn oil, fish liver oils, and the like.

Nordihydroguaiaretic acid is a crystalline solid when pure and may be prepared synthetically or obtained from a natural source. Extracts of plants which contain this compounds as a natural constituent vary considerably in color, consistency and in the amount of nordihydroguaiaretic acid present.

For use as an antioxidant, nordihydroguaiaretic acid, or a proportionate amount of a plant extract containing it, is added to the oil, fat, butter, grease or other oleaginous material in an amount ranging from .001% to 0.1% of the weight of the oleaginous material to which it is added. The materials are thoroughly mixed so as evenly to distribute the compound throughout the oleaginous material.

Even under the most adverse conditions, the resultant oil, fat, butter, grease or other material so treated will resist oxidative rancidity for long periods of time.

As a further illustration of the invention, reference is made to the following examples, which should not however be interpreted as limitations upon the invention.

Example I

Fresh lard of high quality commercial grade was heated until fluid and to it was added 0.1% by weight of crystalline nordihydroguaiaretic acid which had been dissolved in a small amount of ethyl alcohol as a carrier. The lard and alcohol solution of nordihydroguaiaretic acid was thoroughly mixed so as to distribute the acid throughout of the lard.

The lard-nordihydroguaiaretic acid mixture and a control sample of lard without any addition of acid thereto were then tested for the development of rancidity in accordance with the Swift rapid rancidity test, as outlined in the Journal "Oil and Soap," volume 10, pages 105–109 (1933). In accordance with this procedure the control sample developed rancidity at the end of 23 hours, whereas the lard-nordihydroguaiaretic acid mixture (0.1%) did not develop rancidity until 400 hours.

Example II

To a fresh, high quality commercial grade of lard similar to that used in Example I there was added 0.01% by weight of crystalline nordihydroguaiaretic acid which had been dissolved in sufficient ethyl alcohol to produce a convenient solution for mixing. The lard was heated just sufficiently to become fluid and the nordihydroguaiaretic acid in alcohol was added thereto and thoroughly mixed. This mixture along with a a control sample of the lard were subjected to the Swift rapid rancidity test as in Example I. The control sample of high quality commercial lard of the same quality used in the tests developed rancidity after 23 hours, whereas the lard-nordihydroguaiaretic acid mixture (0.01%) did not develop rancidity until 180 hours had elapsed.

Example III

To a fresh, high quality commercial grade of lard similar to that used in Example I there was added 0.001% by weight of crystalline nordihydroguaiaretic acid which had been dissolved in sufficient ethyl alcohol to produce a convenient solution for mixing. The lard was heated just sufficiently to become fluid and the nordihydroguaiaretic acid in alcohol was added thereto and thoroughly mixed. This mixture along with a control sample of the lard were subjected to the Swift rapid rancidity test as in Example I. The control sample developed rancidity after 23 hours, whereas the lard-nordihydroguaiaretic acid mixture (0.001%) did not develop rancidity until 60 hours had elapsed.

It may be pointed out that the fresh, high quality commercial grade of lard used in the foregoing example for admixture with nordihydroguaiaretic acid as a control, had in itself, an exceptionally high keeping time (23 hours in the test) as compared with many grades of lard sold on the American market. Thus Industrial and Engineering Chemistry volume 35, No. 1, page 51, shows that a commercial grade of lard has a keeping time of 5 hours and that lard containing 0.05% gum guaiac has a keeping time of 20 hours.

Any convenient method of mixing the nordihydroguaiaretic acid, or a plant extract containing it, with the lard may be used; thus the powder nordihydroguaiaretic acid may be mixed with a fluid lard in relatively high concentration, and this high concentration mixture used in suitable amounts for protecting a large batch of lard. Concentrations of 0.001% to 0.01% by weight of nordihydroguaiaretic acid, or equivalent amounts of plant extracts containing it, may be used depending upon the degree of protection desired, the preferred range being 0.01% to 0.05%.

Nordihydroguaiaretic acid may also be used as antioxidants in cotton seed oil, corn oil, and soya bean oil, and in meats, fish, and vegetable and meat products in order to protect against oxidative rancidity and deterioration.

Many and obvious variations will occur to those skilled in the art, and are deemed to be within the purview of the invention herein described and claimed.

What I claim is:

1. A material normally subject to the deteriorating effects of oxidative rancidity containing a fractional percentage of nordihydroguaiaretic acid as an antioxidant, sometimes also known as beta, gamma-dimethyl-alpha, delta-bis (3,4-dihydroxyphenyl) butane.

2. A material normally subject to the deteriorating effects of oxidative rancidity and selected from the class consisting of butters, fats, greases, oils and foods comprising such substances, including a fractional percentage of nordihydroguaiaretic acid as an antioxidant, sometimes also known as beta, gamma-dimethyl-alpha, delta-bis (3,4-dihydroxyphenyl) butane.

3. A material normally subject to the deteriorating effects of oxidative rancidity and selected from the class consisting of pharmaceutical medicinal and cosmetic fats, greases, oils, including a fractional percentage of nordihydroguaiaretic acid as an antioxidant, sometimes also known as beta, gamma-dimethyl-alpha, delta-bis (3,4-dihydroxyphenyl) butane.

4. An edible shortening containing a fractional percentage of nordihydroguaiaretic acid as an antioxidant.

5. Lard containing a fractional percentage of nordihydroguaiaretic acid as an antioxidant.

6. A pharmaceutical preparation comprising an edible oil which is normally subject to the deteriorating effects of oxidative rancidity said pharmaceutical being characterized by containing a fractional percentage of nordihydroguaiaretic acid as an antioxidant.

7. A composition of matter comprising nordihydroguaiaretic acid as an antioxidant and a material normally subject to the deteriorating effects of oxidative rancidity.

WALTER M. LAUER.